United States Patent [19]

Seki et al.

[11] Patent Number: 5,297,023

[45] Date of Patent: Mar. 22, 1994

[54] NC DATA EDITING METHOD USING TRANSFORMATION MATRIX AND CONVERSION COMMAND

[75] Inventors: Masaki Seki, Suginami; Takashi Takegahara, Hachioji; Takeshi Arakaki, Urawa, all of Japan

[73] Assignee: Fanuc Ltd., Minamitsuru, Japan

[21] Appl. No.: 646,736

[22] PCT Filed: Jun. 7, 1990

[86] PCT No.: PCT/JP90/00745

§ 371 Date: Jan. 29, 1991

§ 102(e) Date: Jan. 29, 1991

[87] PCT Pub. No.: WO90/15373

PCT Pub. Date: Dec. 13, 1990

[30] Foreign Application Priority Data

Jun. 7, 1989 [JP] Japan .................. 1-143105
Jul. 7, 1989 [JP] Japan .................. 1-174090

[51] Int. Cl.$^5$ ................... G05B 19/42; G06F 15/46
[52] U.S. Cl. ................... 364/192; 364/474.36
[58] Field of Search ............ 364/192, 474.36, 474.23

[56] References Cited

U.S. PATENT DOCUMENTS

| | | | |
|---|---|---|---|
| 3,809,868 | 5/1974 | Villalobos et al. | 364/474.36 |
| 4,734,864 | 3/1988 | Kawamura et al. | 364/474.23 |
| 4,862,381 | 8/1989 | Shibata | 364/474.36 |
| 4,870,595 | 9/1989 | Otsuki | 364/474.23 |

Primary Examiner—Jerry Smith
Assistant Examiner—Jim Trammell
Attorney, Agent, or Firm—Staas & Halsey

[57] ABSTRACT

An NC data editing method speedily and accurately edits NC data, e.g., for modification of the movement path of a controlled object. When three positional conversion command blocks are successively read from original data in a data conversion process following a data modification process, a position transformation matrix is calculated based on coordinate value data for three sets of reference points and corresponding points in the blocks (S211). For a mirror conversion command block, a mirror transformation matrix is calculated based on coordinate value data for two points stated in the block (215). An up-to-date composite transformation matrix is obtained by multiplying a previous composite transformation matrix by a now calculated transformation matrix (S213). Each time a movement command block is read, post-positional-conversion or post-mirror-conversion command point data is obtained by multiplying movement command point data in each block by the up-to-date composite transformation matrix (S217). When a conversion command cancellation block is read, a new composite transformation matrix is obtained by multiplying the up-to-date composite transformation matrix by an inverse matrix of the most recent transformation matrix (S218), so that only the conversion process associated with the most recent transformation matrix is canceled. After all the data blocks are converted, tool paths are drawn based on the converted data for an operator's inspection. NC data editing ends when a desired tool path is obtained and approved by the operator.

10 Claims, 9 Drawing Sheets

FIG. 4
```
O 1 2 3 4.5 ;
G 9 8 P 1 X xa Y ya Z za I ia J ja K ka ;
G 9 8 P 2 X xb Y yb Z zb I ib J jb K kb ;
G 9 8 P 3 X xc Y yc Z zc I ic J jc K kc ;
G 9 8 P 0 X xd Y yd Z zd I id J jd K kd ;
G 0 1 X x1 Y y1 Z z1 ;
      X x2 Y y2 Z z2 ;
      X x3 Y y3 Z z3 ;
G 9 9 ;
G 9 9 ;
```
FIG. 5
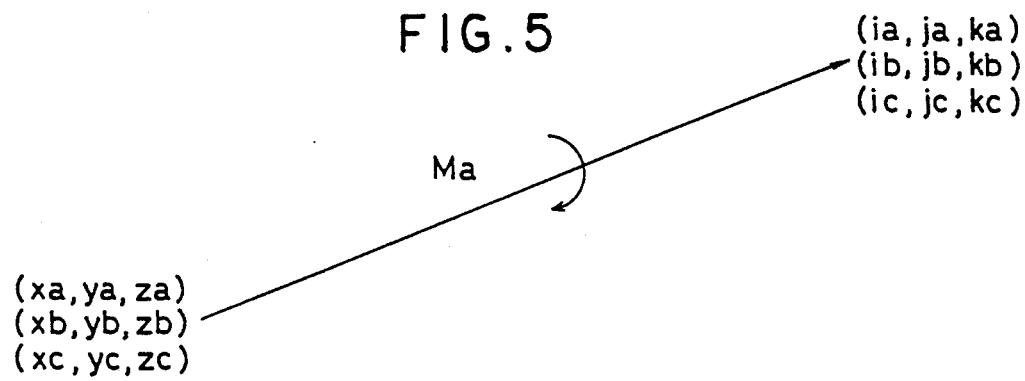
FIG. 6
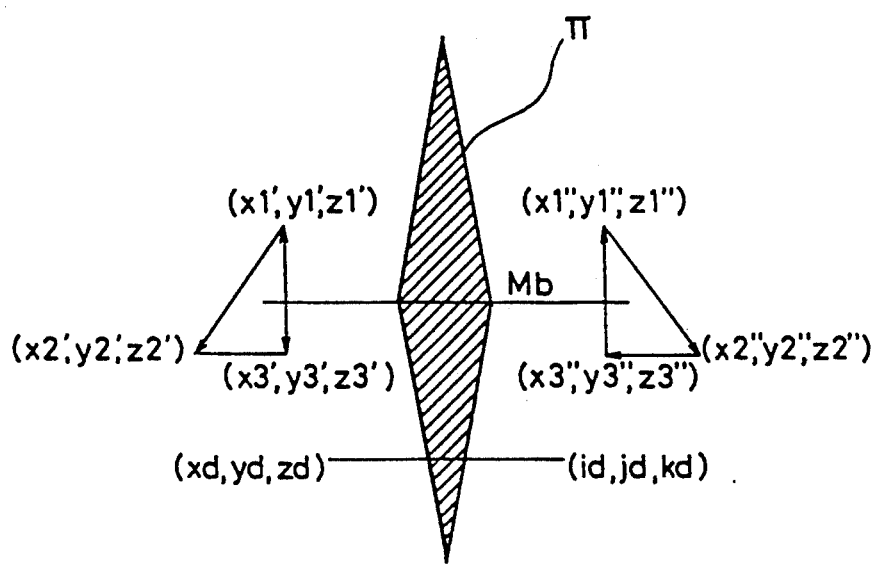

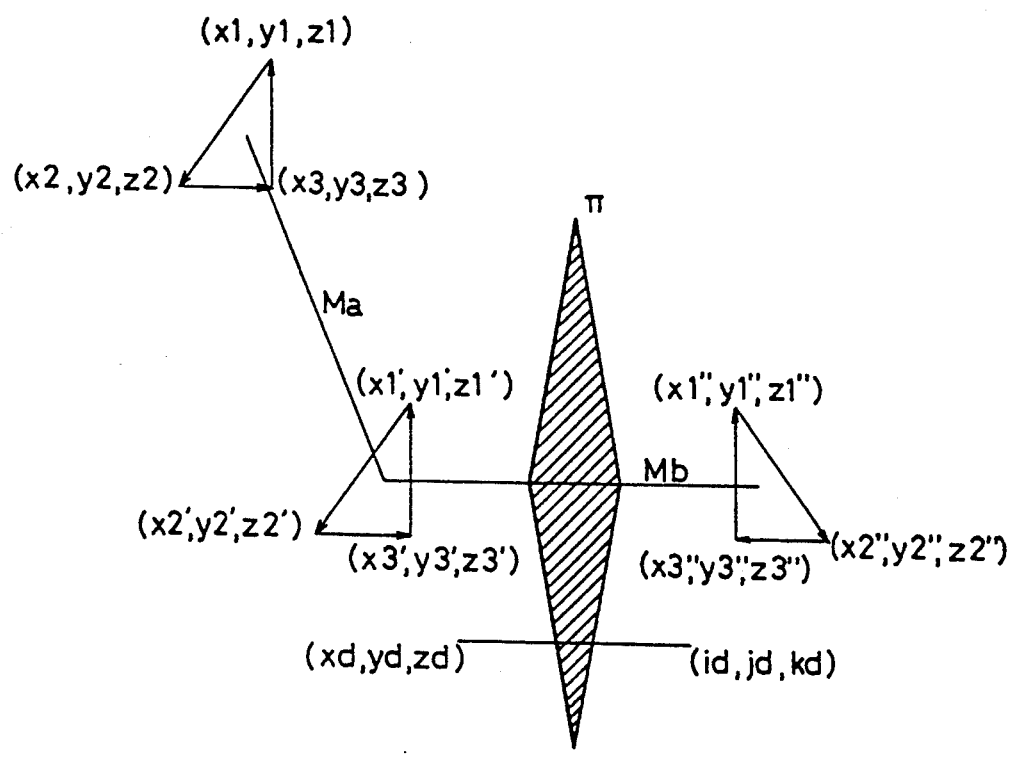

FIG. 9

```
O 1 2 3 4 5 ;
G 9 8 P 1 Xxa Yya Zza Iia Jja Kka ;
G 9 8 P 2 Xxb Yyb Zzb Iib Jjb Kkb ;
G 9 8 P 3 Xxc Yyc Zzc Iic Jjc Kkc ;
G 0 1 Xx1 Yy1 Zz1 ;
      Xx2 Yy2 Zz2 ;
      Xx3 Yy3 Zz3 ;

```
O 1 2 3 4 5 ;
G 9 8 P 0 Xxd Yyd Zzd Iid Jjd Kkd ;
G 0 1 Xx1' Yy1' Zz1' ;
      Xx2' Yy2' Zz2' ;
      Xx3' Yy3' Zz3' ;
G 9 9 ;
```

NC DATA EDITING METHOD USING TRANSFORMATION MATRIX AND CONVERSION COMMAND

BACKGROUND OF THE INVENTION

FIELD OF THE INVENTION

The present invention relates to an NC data editing method, and more particularly, to a method capable of speedily and accurately editing NC data, e.g., for modification of a movement path of a controlled object.

DESCRIPTION OF THE RELATED

In numerical control, previously originated NC data is executed by a numerical control device to produce a control output corresponding to a target movement path of a controlled object such as a tool, and a drive mechanism is controlled by a servo system which responds to the control output, so that the controlled object is moved along the target path. Therefore, if the movement path generated in accordance with the originated NC data must be modified, the NC data must be so edited as to modify associated coordinate value data in the NC data. In conventional NC data editing, coordinate value data individually representative of a group of points specifying a desired movement path are individually determined by manual calculation in accordance with coordinate value data individually representative of a group of points specifying an original movement path and a required amount of shift from the original path to the desired path. Then, the newly calculated coordinate value data is set in place of the original coordinate value data. The manual calculation for determination of the new coordinate value data, however, is complicated, requires much time and labor, and in addition, is liable to error. Thus, the reliability of the edited NC data is low.

In the case of using two robots disposed symmetrically with respect to the axis of a workpiece to move two tools along movement paths symmetrical with respect to the workpiece axis so as to perform a required machining operation, it is conventionally known to edit NC data originated for one of the robots by subjecting the NC data to a mirror conversion process so as to originate NC data for the other robot. Conventionally, in this case, post-mirror-conversion coordinate value data are individually determined by manual calculation in accordance with coordinate value data constituting the original NC data and data specifying a mirror plane, and then the NC data is edited by using the coordinate value data thus calculated. Accordingly, similar problems are encountered as in the case of the aforementioned NC data editing for the movement path modification.

SUMMARY OF THE INVENTION

An object of the present invention is to provide an NC data editing method in which editing of NC data, e.g., for modification of the movement path of a controlled object can be effected speedily and accurately.

In order to achieve the above object, an NC data editing method according to the present invention comprises the steps of: (a) additionally programming a conversion command in originated NC data; (b) additionally programming a conversion cancellation command in the NC data; (c) automatically calculating and defining a transformation matrix when the conversion command is read from the NC data; (d) converting a point associated with a movement command by using the transformation matrix, thereby automatically obtaining a post-conversion point, every time the movement command is read from the NC data, before the conversion cancellation command is read after the transformation matrix is defined; and (e) automatically rewriting the NC data by using the post-conversion point.

Preferably, the conversion command is a positional conversion command composed of a positional conversion command code, coordinate value data individually representative of a group of reference points which are permitted to be arbitrarily set, and coordinate value data individually representative of a group of corresponding points corresponding individually to the group of reference points, the number of reference points which constitute the group of reference points being selected so as to be identical with the dimension of the NC data. Alternatively, the conversion command is a mirror conversion command composed of a mirror conversion command code and coordinate value data individually representative of two points which specify a straight line extending perpendicular to a mirror plane and having a middle point thereof at which the mirror plane is located, the dimension of each of the coordinate data being identical with the dimension of the NC data. A post-positional-conversion or post-mirror-conversion point corresponding to the point associated with the movement command is automatically obtained by using a position transformation matrix or a mirror transformation matrix automatically calculated in accordance with the coordinate value data when the positional conversion command code or the mirror conversion command code is read from the NC data. Preferably, moreover, a plurality of conversion commands are programmed in the NC data, and, every time an up-to-date transformation matrix is calculated upon one conversion command being read, an up-to-date composite transformation matrix is automatically obtained by multiplying the product of transformation matrixes having been calculated so far in succession by the calculated up-to-date transformation matrix, and is defined as a transformation matrix used for conversion of the point associated with the movement command, in place of the composite transformation matrix having been used so far. Every time a conversion cancellation command is read, a composite transformation matrix defined immediately before the lastly defined transformation matrix is defined as the transformation matrix used for conversion of the point associated with the movement command, in place of the lastly defined composite transformation matrix. Preferably, the NC data is composed of a main program and a group of sub-programs. A conversion command programmed in the main program is rendered effective for the main program and the group of sub-programs, and a conversion command programmed in each of the sub-programs is rendered effective for the sub-program. Preferably, the movement path of the controlled object is graphically displayed in accordance with the NC data rewritten in step (e), and an operator's modification of the rewritten NC data is allowed.

According to the present invention, as described above, before the conversion cancellation command is read from the previously originated NC data, every time the movement command is read from the originated NC data, the point associated with the movement command is converted by using the transformation matrix automatically calculated and defined when the conversion command is read from the NC data, thereby automatically obtaining the post-conversion point, and then the NC data is automatically rewritten by using the post-conversion point thus obtained. Accordingly, the NC data can be automatically edited by only additionally programming the conversion command and the conversion cancellation command in the NC data. Thus, the NC data editing requires no complicated manual calculation, the time required for the editing operation can be considerably shortened, and the reliability of the edited NC data is improved.

Preferably, the post-positional-conversion or post-mirror-conversion point corresponding to the point associated with the movement command is automatically obtained by using the position transformation matrix or the mirror transformation matrix automatically calculated in accordance with the coordinate value data contained in the conversion command when the positional conversion command code or the mirror conversion command code contained in the conversion command is read. Accordingly, the positional conversion and the mirror conversion can be automatically effected by only additionally programming the command codes and the coordinate value data in the NC data. Preferably, moreover, the up-to-date composite transformation matrix is obtained by multiplying the product of the transformation matrices having been calculated so far in succession by the up-to-date transformation matrix every time the up-to-date transformation matrix is calculated as the conversion command is read, and this transformation matrix is defined as the transformation matrix used for conversion of the point associated with the movement command. Further, every time the conversion cancellation command is read, the composite transformation matrix defined immediately before the lastly defined composite transformation matrix is defined as the transformation matrix used for conversion of the point associated with the movement command. Thus, one conversion can be effected for each of the points associated with the movement command and two or more required conversions can be effected by only additionally programming a plurality of conversion commands and conversion cancellation commands in place in the NC data. Preferably, furthermore, the conversion command programmed in the main program of the NC data is made effective for the main program and the group of sub-programs, and thus the tool paths defined individually in these sub-programs can be modified without changing the positional relationships between these tool paths. Further, the conversion command programmed in each sub-program is made effective for the sub-program, whereby the tool paths defined in the individual sub-programs and representative of parts configurations individually associated therewith can be independently modified. Accordingly, the individual tool paths can be modified so that more parts can be manufactured from a workpiece, for example. Preferably, the path of movement of the controlled object is graphically displayed in accordance with the rewritten NC data, and the operator's modification of the rewritten NC data is allowed. Therefore, if the graphically displayed movement path is not a desired one, the operator can modify the rewritten NC data to obtain the desired movement path.

BRIEF DESCRIPTION OF THE DRAWINGS

FIG. 4 is a diagram illustrating original NC data as an object of editing obtained by executing a data modification process of FIG. 1;

FIG. 5 is a diagram showing the function of a position transformation matrix obtained during the data editing process of FIG. 2;

FIG. 6 is a diagram showing the function of a mirror transformation matrix obtained during the data editing process;

FIG. 7 is a diagram showing the function of a composite transformation matrix obtained during the data editing process;

FIG. 8 is a diagram illustrating the contents of converted data obtained during the data editing process;

FIG. 9 is a diagram showing a modification of the original NC data;

FIG. 10 is a diagram showing post-editing NC data corresponding to the original data of FIG. 9;

FIG. 11 is a diagram showing another modification of the original data;

FIG. 12 is a diagram showing post-editing NC data corresponding to the original data of FIG. 11;

DESCRIPTION OF THE PREFERRED EMBODIMENT

Figure 1:
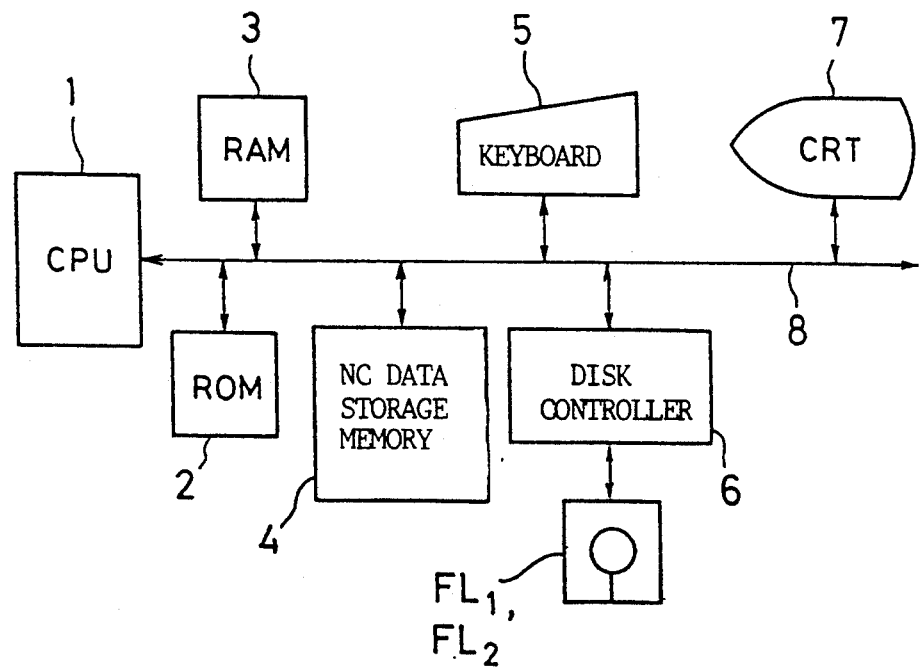
FIG. 1 is a schematic block diagram showing the principal part of an automatic programming apparatus for embodying an NC data editing method according to one embodiment of the present invention.

Referring to FIG. 1, an automatic programming apparatus comprises a processor (CPU) 1 for executing a control program, a read-only memory (ROM) 2 storing the control program, a random-access memory (RAM) 3 for storing a system program, results of operation by the CPU 1, etc., and a memory 4 for storing NC data. The programming apparatus further comprises a keyboard 5, a disk controller 6, and a graphic display unit (CRT) 7. The disk controller 6 is arranged to be loaded with a first floppy disk FL1 storing various system programs for the origination and modification of the NC data and NC data editing, and a second floppy disk FL2 storing originated NC data. The elements 2 to 7 are connected to the CPU 1 through busses 8.

Figure 2:
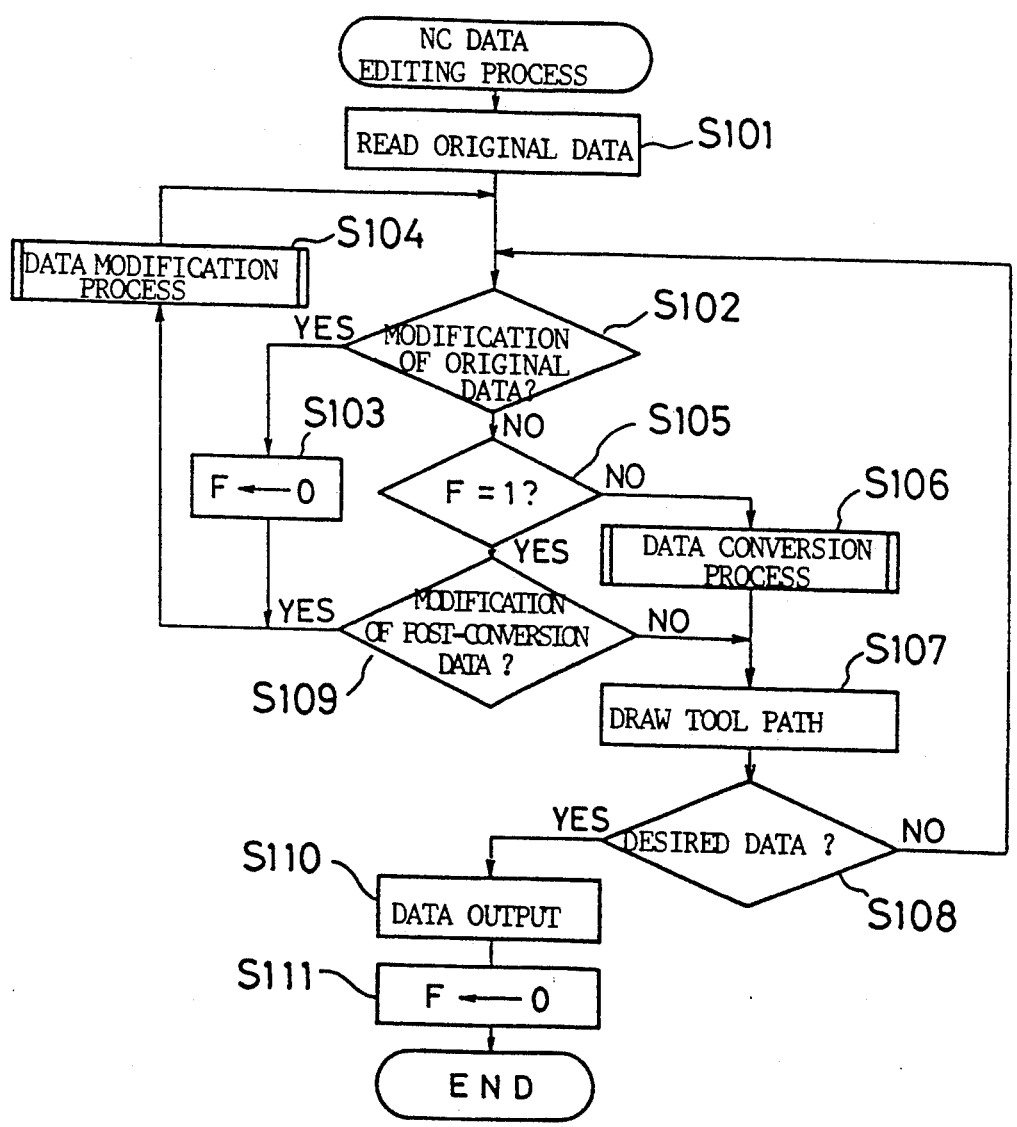
FIG. 2 is a flowchart showing an NC data editing process executed by the programming apparatus shown in FIG. 1.
Figure 3:
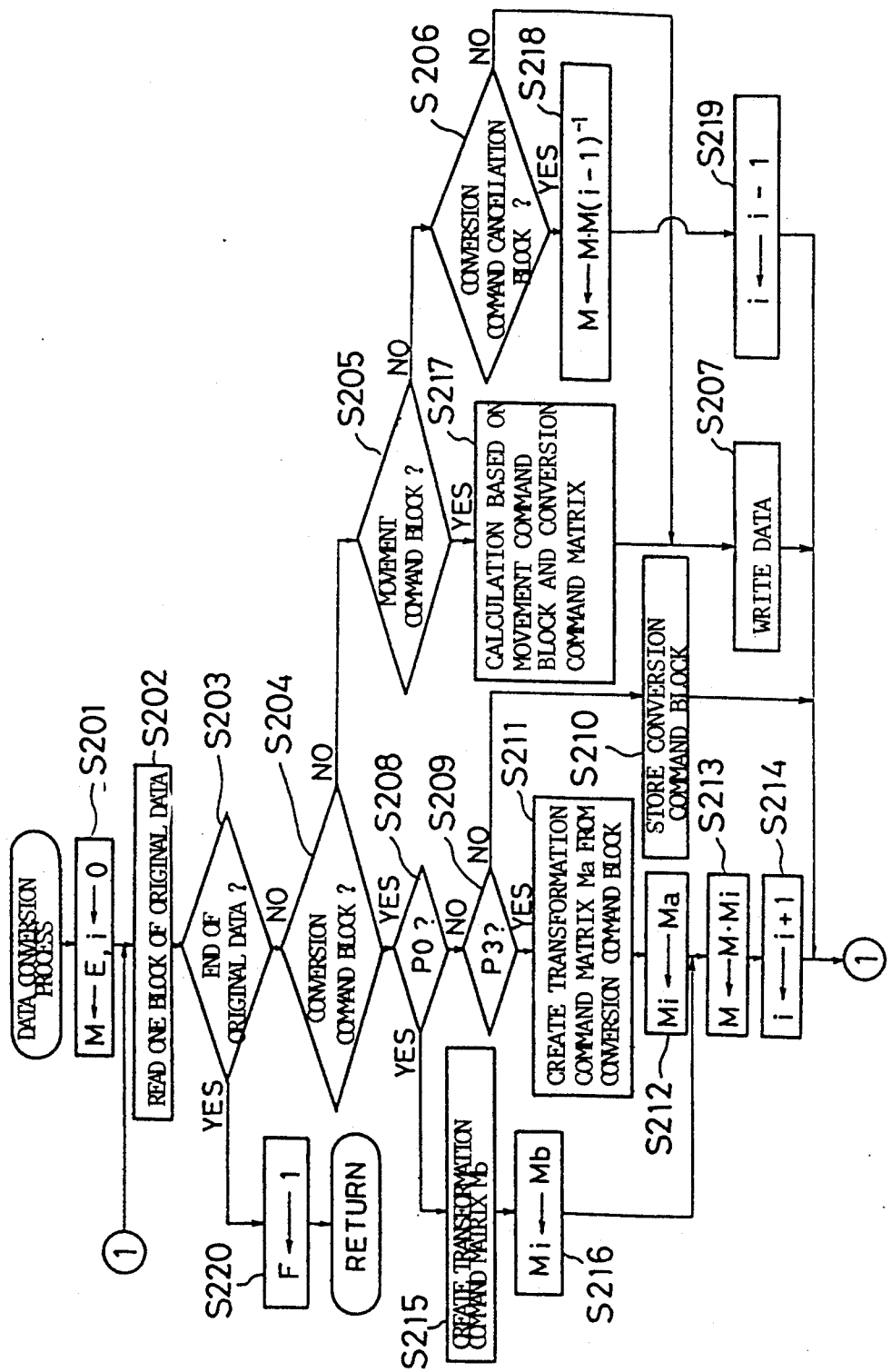
FIG. 3 is a flowchart showing a data conversion process of FIG. 2 in detail.

Referring now to FIGS. 2 and 3, an NC data editing process executed by the automatic programming apparatus will be described.

When the first floppy disk FL1 is set into the disk controller 6 after the power to the automatic programming apparatus is turned on, the CPU 1 executes the control program stored in the ROM 2, and causes the CRT 7 to display a system program selection menu on its screen.

If an operator enters the system program for NC data editing and a program number specifying the NC data to be edited into the automatic programming apparatus through the keyboard 5, with reference to the selection menu, the CPU 1 transfers the system program for NC data editing from the first floppy disk FL1 to the RAM 3, and also transfers original data specified by the program number from the NC data memory 4 to the RAM 3 (Step S101 of FIG. 2). If no original data is stored in the memory 4, the operator loads the disk controller 6 with the second floppy disk FL2 which is stored with the original data, whereupon the CPU 1 transfers the original data from the disk FL2 to the RAM 3. In Step S102 following Step S101, the CPU 1 causes the CRT screen to display thereon a message for inquiry about the necessity of modification of the original data, and then stands by.

If the operator operates a modification execution key of the keyboard 5, concluding that the original data should be modified, e.g., in order to correct the contents of the original data, or to program various conversion commands and a conversion cancellation command (described in detail later with reference to FIG. 4) in addition to the original data, the CPU 1 resets a flag F to the value "0," which represents an incomplete data conversion process (Step S103), and then executes a data modification process (Step S104). This data modification process is executed in the conventional manner by means of the editor function of the automatic programming apparatus, and the modified original data is stored in the RAM 3. When the data modification process is finished, the program returns to Step S102, whereupon the CPU 1 stands by again. If necessary, therefore, the original data can be repeatedly modified.

If the operator operates a modification nonexecution key (escape key) of the keyboard 5, concluding that the original data need not be modified or that the modification of the original data is completed, the CPU 1 determines whether or not the flag F is set to "1," which represents completion of the data conversion process (Step S105). Since the flag F is reset to "0" in Step S103, the result of the determination in Step S105 is negative, and thus the program proceeds to the data conversion process of Step S106. In this case, the modified original data is supposed to contain the data contents shown in FIG. 4. The modified original data consists of various data blocks contained in the unmodified original data and various data blocks programmed in addition to the original data by the aforesaid data modification, for example.

More specifically, in the modified original data shown in FIG. 4, a numeric code "012345" represents a program number specifying the original data, and a data block containing this program number is initially contained in the unmodified original data. A code "G01" represents a conventional linear interpolation code for defining linear interpolation between two points on an XYZ three-dimensional coordinate system, which is modally applied to one or more blocks (hereinafter referred to as movement command blocks) each of which is composed of characters X, Y and Z individually representative of control axes and numerical data suffixed to these individual characters. The movement command block is contained in the unmodified original data. A code "G98" is added to the original data during the data modification process, for example, in order to assign various conversion processes peculiar to the method of the present embodiment, and has qualifier codes "P0" to "P3" affixed thereto. Namely, a code "G98P0" is a mirror conversion code, and a dimension word following the same is composed of characters X, Y, Z, I, J and K and numerical data (represented by symbols xd, yd, zd, id, jd and kd in FIG. 4) following these individual characters. This mirror conversion code defines a mirror conversion using a mirror plane which is located at the middle point of a straight line connecting two arbitrary points (e.g., point (xd, yd, zd) and point (id, jd, kd)), and extends perpendicular to the straight line. Each of codes "G98P1" to "G98P3" is a positional conversion command code, which defines a positional conversion for moving an arbitrary point (hereinafter referred to as a reference point) first assigned by a dimension word following the code to an arbitrary point (hereinafter referred to as corresponding point) assigned next, e.g., for moving a reference point (xa, ya, za) to a corresponding point (ia, ja, ka). The reference point may, for example, be a point which specifies a partial section of a tool path generated by the unmodified original data. In this case, the corresponding point represents a point of destination. Further, a code "G99" is a conversion cancellation command code peculiar to the method of the present embodiment, and defines the cancellation of the conversion process assigned by the code "G98."

In the data conversion process (corresponding to Step S106 of FIG. 2) shown in detail in FIG. 3, the CPU 1 sets a unit matrix E in a memory M provided, e.g., in a predetermined storage region of the RAM 3, and resets an index i to the value "0" (Step S201). Then, the CPU 1 reads out the first block "012345;" of the original data from the RAM 3 (Step S202), and successively determines whether or not this data block is a block containing a code indicating the end of the original data, a conversion command block containing the code "G98," a movement command block containing a dimension word "X_Y_Z_," or a conversion command cancellation block (Steps S203 to S206). For the first block "012345;", since the results of the determination in these steps are all negative, the CPU 1 writes the data block read out in Step S202 in a converted data storage region of the RAM 3, as data obtained after the data conversion process (Step S207), whereupon the program returns to Step S202.

The next data block "G98P1XxaYyaZzaIiaJjaKka;" is read out in Step S202, and a determination is made in Step S203 as to whether or not this data block indicates the end of the original data. Since the result of this determination is negative, a further determination is made in Step S204 as to whether or not this data block is a conversion command block. Since the data block contains the code "G98," the result of the determination in this step is positive. Thus, determinations are made in sequence as to whether or not the data block contains the qualifier code "P0" or "P3" (Steps S208 and S209). Here, the results of the determination in these steps are both negative. In this case, the program proceeds to Step S210 where the code "G98P1," a coordinate value "xa, ya, za" indicating the reference point, and a coordinate value "ia, ja, ka" indicating the corresponding point, which are stated in the data block, are temporarily stored individually in built-in registers of the CPU 1. Then, the program returns to Step S202.

The CPU 1 concludes in Step S203 that a third data block "G98P2XxbYybZzbIibJjbKkb;" read out in Step S202 does not contain a code indicating the end of the original data, and concludes in Step S204 that this data block contains the code "G98." Moreover, in Steps S208 and S209, the CPU 1 concludes that this data block contains neither of the codes "P0" and "P3." Therefore, as in the case of the second data block, the CPU 1 loads the registers individually with the code "G98P2," a coordinate value "xb, yb, zb" indicating the reference point, and a coordinate value "ib, jb, kb" indicating the corresponding point, which are stated in the third data block, and then the program returns to Step S202.

The results of the determination in Steps S203 and S204 for a fourth data block "G98P3XxcYycZzcIicJjcKkc;" read out next in Step S202 are negative and positive, respectively, and the results of the determination in Steps S208 and S209 for the same block are negative and positive, respectively. Thus, the program proceeds to Step S211. In Step S211, the CPU 1 reads out coordinate values "xa, ya, za," "xb, yb, zb," and "xc, yc, zc" individually indicating three reference points and coordinate values "ia, ja, ka," "ib, jb, kb," and "ic, jc, kc" individually indicating three corresponding points, and then calculates a position transformation matrix Ma on the basis of these coordinate values. Generally, the position transformation matrix Ma is a combination (FIG. 5) of a translation and a rotational shift for mating each of the three reference points with its associated corresponding point, and is defined solely by the three reference points and the three corresponding points. Moreover, the use of this position transformation matrix Ma makes it possible to obtain a point which has the same positional relation to an arbitrary point on the XYZ three-dimensional coordinate system as the positional relation between the three reference points and the three corresponding points. In other words, the positional relation between an arbitrary coordinate value (x, y, z) and a coordinate value (x', y', z') obtained by multiplying the value (x, y, z) by the position transformation matrix Ma is equal to the positional relation between the reference points and the corresponding points.

In Step S212, the CPU 1 loads a memory Mi (here, memory M0) corresponding to the index i with the position transformation matrix Ma calculated in Step S211. Then, the CPU 1 loads the memory M with a matrix (here, matrix Ma equal to the product of the unit matrix E and the position transformation matrix Ma) obtained by multiplying the matrix stored in the memory M in Step S201 by the matrix stored in the memory Mi, that is, a composite transformation matrix (Step S213). Then, after the index i is incremented by "1," the program returns to Step S202.

The result of the determination in Step S203 for a fifth data block "G98P0XxdYydZzdIidJjdKkd;" read out next in Step S202 is negative, and the results of the determination in Steps S204 and S208 for the same block are both positive. Hence, the program proceeds to Step S215. In Step S215, the CPU 1 calculates a mirror transformation matrix Mb on the basis of numerical data contained in the fifth data block.

More specifically, the CPU 1 determines a straight line connecting two points represented individually by two coordinate values (xd, yd, zd) and (id, jd, kd) contained in the fifth data block additionally programmed in the NC data, and then determines a mirror plane II which intersects this straight line at right angles at the middle point of the straight line. Further, the CPU 1 determines the mirror transformation matrix Mb which depends solely on the mirror plane II. If points (x1', y1', z1'), (x2', y2', z2'), and (x3', y3', z3') are subjected to mirror conversion using the matrix Mb, these three points are respectively converted into points (x1", y1", z1"), (x2", y2", z2"), and (x3", y3", z3"), which are symmetrical thereto with respect to the mirror plane II, as shown in FIG. 6.

In Step S216 following Step S215, the mirror transformation matrix Mb is stored in the memory Mi (M1) corresponding to the index i under the control of the CPU 1. Then, the CPU 1 multiplies the matrix (composite transformation matrix) stored in the memory M by the matrix stored in the memory Mi, and loads the memory M with the resultant matrix in place of the matrix having been stored therein so far. Here, the memory M is loaded with a composite transformation matrix which is equal to the product Ma·Mb of the position transformation matrix Ma and the mirror transformation matrix Mb and which simultaneously defines the position conversion and mirror conversion. Then, after the index i is incremented by the CPU 1, the program proceeds to Step S202.

The results of the determination in Steps S203 and S204 for a sixth data block "G01Xx1Yy1Zz1;" read out next in Step S202 are both negative, and it is determined in Step S205 that this block is a movement command block, and hence the program proceeds to Step S217. In Step S217, the CPU 1 executes a conversion process for the point represented by movement command data "x1, y1, z1" contained in the data block. Namely, the CPU 1 obtains a coordinate value "x1", y1", z1"," indicating the point specified after the conversion, by multiplying the movement command data "x1, y1, z1" by a composite transformation matrix stored in the memory M at the time of the conversion process. Here, the composite transformation matrix by which the movement command data is multiplied is equal to the product Ma·Mb of the position transformation matrix Ma and the mirror transformation matrix Mb. Thus, the positional conversion and mirror conversion for the movement command point are simultaneously executed. For example, the point (x1, y1, z1) shown in FIG. 7 is first converted into the point (x1', y1', z1') by a positional conversion process using the matrix Ma, and is then further converted into the point (x1", y1", z1") symmetrical to the point (x1', y1', z1') with respect to the mirror plane II by a mirror conversion process using the matrix Mb. Actually, however, the coordinate value "x1", y1", z1'''" is immediately calculated by means of the CPU 1 on the basis of the movement command data "x1, y1, z1" and the matrix Ma·Mb equal to the product of the matrices Ma and Mb. Then, in Step S207 following Step S217, the CPU 1 writes the coordinate value "x1", y1", z1''''" for the point after the conversion in the RAM 3 as data after the execution of the conversion process.

Subsequently, the CPU 1 reads the next data block of the original data (Step S202). As illustrated in FIG. 4, another movement command block is read; thus a series of steps including Steps S203 to S205, S217 and S207 is executed in succession, following Step S202. As a result, data "x2", y2", z2''''" indicating a post-conversion point, which corresponds to a point represented by movement command data "x2, y2, z2," is written in the RAM 3. Also in the case of the next movement command block, post-conversion data "x3", y3", z3''''" corresponding to movement command data "x3, y3, z3" is stored in the RAM 3. FIG. 8 shows data contents stored in the converted data storage region of the RAM 3 by this point of time.

Thereafter, the CPU 1 discriminates the type of the next data block read in Step S202. Here, since a data block "G99;" is read, the results of the determination in Steps S203 to S205 are all negative, and thus it is determined in Step S206 that this block is a conversion command cancellation block. In this case, the program proceeds to Step S218. In Step S218, the CPU 1 multiplies the transformation matrix stored in the memory M at the time of the program procession by an inverse matrix of the transformation matrix stored at this time point in a memory $Mi-1$ corresponding to the index i, and loads the memory M with the resultant transformation matrix in place of the transformation matrix having been stored therein so far. Here, the memories M and $Mi-1$ (M1) are loaded with the transformation matrices Ma·Mb and Mb, respectively, and hence the transformation matrix Ma (Ma·Mb·Mb$^{-1}$) is calculated and stored in Step S218. Namely, the definition for the mirror conversion is canceled. In this manner, the lastly defined conversion command is canceled every time a conversion cancellation command block is read from the original data. In order to practically clear the storage of the transformation matrix associated with the canceled conversion command in the memory $Mi-1$, the CPU 1 decrements the index i by "1" in Step S219, that is, it allows the memory M1 to store the transformation matrix defined next, and then the program proceeds to Step S202.

When the next data block "G99;" is read from the RAM 3 in Step S202, the CPU 1 executes Steps S203 to S206, and determines that this data block is a conversion command cancellation block. Accordingly, the CPU 1 multiplies the transformation matrix stored in the memory M by an inverse matrix of the transformation matrix stored in the memory $Mi-1$, and loads the memory M with the resultant transformation matrix (Step S218). Here, the memories M and $Mi-1$ (M0) are each loaded with the transformation matrix Ma, and hence the unit matrix E (Ma·Ma$^{-1}$) is calculated and stored in the memory M. Thus, the definition for the positional conversion is canceled. Also, the index i is decremented so that the storage of the position transformation matrix in the memory M0 is cleared (Step S219), and then the program proceeds to Step S202.

Thereafter, the CPU 1 executes one or more corresponding steps, out of the aforesaid series of steps, every time the next block of the original data is read out from the RAM 3 in Step S202. As described above, if the data block does not indicate the end of the original data (S203), determinations are made as to whether this block is a positional conversion command block, mirror conversion command block, movement command block, or conversion command cancellation block (Steps S204 to S206, S208, S209). If the data block is none of these four kinds, it is written as converted data in the RAM 3 (Step S207). If the block is the positional conversion command block, the position transformation matrix Ma is calculated in accordance with a set of coordinate value data indicating the reference point and the corresponding point, read from this block, and two sets of coordinate value data read in a like manner (Step S211). If the block is the mirror conversion command block, the mirror transformation matrix Mb is calculated in accordance with coordinate value data indicating two points, read from this block (Step S215). Every time the transformation matrix is calculated in Steps S211 and S215, the calculated transformation matrix is stored in the up-to-date region Mi of the memory for transformation matrix storage (Steps S212 and S216). Also, a matrix equal to the product (initially, unit matrix E) of the transformation matrixes having so far been individually calculated and stored in the memory M is multiplied by the aforesaid transformation matrix, and the resultant matrix, i.e., a matrix equivalent to a composite of an arbitrary number of transformation matrixes of any desired types, is stored in the memory M (Step S213). If the block is the movement command block, coordinate value data indicating the movement command point, read from this block, is multiplied by the transformation matrix stored in the memory M, and the resultant post-conversion data is written (Steps S217 and S207). If the block is the conversion command cancellation block, a matrix obtained by multiplying the matrix in the memory M by an inverse matrix of the up-to-date transformation matrix is stored in the memory M (Step S218), thereby canceling only the most recent conversion process associated with the up-to-date transformation matrix.

Thereafter, if a program end code (e.g., code "M02") indicating the end of the original data is contained in the data block read out from the RAM 3 in Step S202, the CPU 1 determines that the data conversion process (FIG. 3) for all the blocks of the original data is completed, and sets the flag F to the value "1" which indicates the completion of the data conversion process (Step S220). Then, the program proceeds to Step S107 of the NC data editing process (FIG. 2).

In Step S107, the tool path is drawn on the CRT screen in accordance with the post-conversion data stored in the converted data storage region of the RAM 3, under the control of the CPU 1, and the CPU 1 stands by (Step S108). The operator examines whether or not the drawn tool path is a desired one. If the tool path is not the desired one, the operator operates a retry key of the keyboard 5 to further modify the NC data, in order to generate the desired tool path. In response to this key operation, the CPU 1 causes the CRT screen to display thereon a message for inquiry about the necessity of modification of the original data, and then stands by (Step S102).

Here, the operator operates the modification execution key to modify the original data, in order to allow the generation of the desired tool path. In response to this, the CPU 1 resets the flag F to the value "0" which indicates incompletion of the data conversion process (Step S103), and then the program proceeds to the aforementioned data modification process (Step S104). During the data modification process, the operator performs a required keyboard operation for the modification of the original data. In response to this key operation, the CPU 1 modifies the original data, and stores the modified data in the RAM 3. After the data modification process is finished, the CPU 1 stands by again (Step S102).

After repeating the execution of the data modification process of Step S104 as required, the operator operates the escape key of the keyboard 5. In response to this key operation, the CPU 1 determines whether or not the flag F is set at the value "1" which indicates completion of the data conversion process (Step S105). Since the flag F is reset to the value "0" in Step S103, the program proceeds to Step S106, and then the aforesaid data conversion process is executed for the modified original data by means of the CPU 1. Based on the original data subjected to the data conversion process, the tool path corresponding thereto is drawn on the CRT screen (Step S107). If the desired tool path cannot be obtained yet, the above-described data modification process is executed again.

If it is thereafter determined that the desired tool path is obtained, the operator operates an edit end key of the keyboard 5. In response to this key operation, the CPU 1 transfers the NC data, which is written in the converted data storage region and capable of generating the desired tool path, as edited data, from the RAM 3 to the NC data memory 4 to store the NC data therein, or transfers the NC data from the RAM 3 through the disk controller 6 to the second floppy disk FL2 to store the data therein (Step S110). Then, the CPU 1 resets the flag F to the value "0" in Step S111, whereby the NC data editing process ends.

If the operator operates the modification nonexecution key (escape key), concluding that the original data need not be modified, in response to the display of the message for inquiry about the necessity of modification of the original data, despite the operator's operation of the retry key based on the conclusion that the tool path drawn immediately after the data conversion process at Step 106 on the CRT screen is the desired one, then the CPU 1 determines whether or not the value of the flag F is "1," (Step S105). Immediately after the data conversion process, the flag F is set to the value "1," and thus the CPU 1 causes the CRT screen to display thereon the message for inquiry about the necessity of modification of the post-conversion data, and then stands by (Step S109). If the operator operates the modification execution key, concluding that the data should be modified, the CPU 1 starts to execute the data modification process in response to this key operation (Step S104). If, on the other hand, the operator operates the escape key, concluding that the data need not be modified, the tool path is drawn again under the control of the CPU 1 (Step S107). If the operator thereafter operates the edit end key, concluding that the desired tool path is obtained, the edited data is stored in the NC data memory 4 or in the second floppy disk FL2, and the NC data editing process ends (Steps S110 and S111).

The present invention is not limited to the embodiment described above, and various modifications thereof may be made.

In the above embodiment, for example, both the positional conversion command block and the mirror conversion command block are additionally programmed in the original data. Alternatively, only the positional conversion command block or only the mirror conversion command block may be added to the original data.

If only the positional conversion command block is added, as shown in FIG. 9, movement command points (x1, y1, z1), (x2, y2, z2), and (x3, y3, z3) are individually subjected to the positional conversion process using the position transformation matrix Ma calculated based on three reference points (xa, ya, za), (xb, yb, zb), and (xc, yc, zc) and three corresponding points (ia, ja, ka), (ib, jb, kb), and (ic, jc, kc), as is apparent from the description in connection with the above embodiment. FIG. 10 shows the post-editing contents of the NC data corresponding to the original data of FIG. 9. In FIG. 10, coordinate values (x1', y1', z1'), (x2', y2', z2'), and (x3', y3', z3') individually represent movement command points specified after the positional conversion.

If only the mirror conversion command block is added, as shown in FIG. 11, the movement command points (x1', y1', z1'), (x2', y2', z2'), and (x3', y3', z3') are individually subjected to the mirror conversion process using the mirror transformation matrix Mb calculated based on the two coordinate values (xd, yd, zd) and (id, jd, kd) described in the block concerned. FIG. 12 shows the post-editing contents of the NC data corresponding to the original data of FIG. 11. In FIG. 12, coordinate values (x1", y1", z1"), (x2", y2", z2"), and (x3", y3", z3") individually represent movement command points specified after the mirror conversion.

Also, the present invention may be applied to NC data which is composed of a main program and a group of sub-programs.

Figure 13:
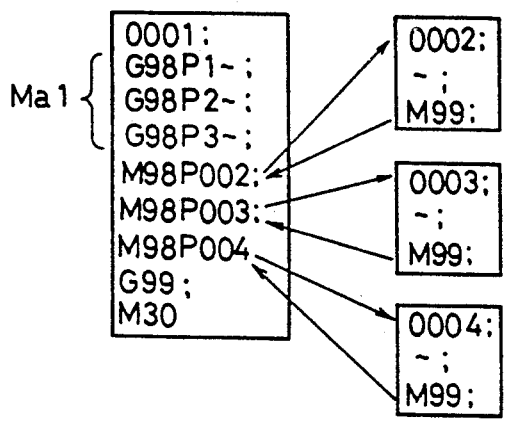
FIG. 13 is a diagram showing still another modification of the original data.

As shown in FIG. 13, for example, the main program of the NC data of this type contains a data block "0001;" specifying the program number, a data block including a code "M98" for invoking a sub-program and sub-program numbers "P002" to "P004" for assigning the sub-program to be invoked, and a code "M30" indicating the program end of the main program. As in the case of the foregoing embodiment, conversion command blocks peculiar to the present invention, e.g., positional conversion command blocks "G98P1~;" "G98P2~;" and "G98P3~;" (where the symbol "~" represents coordinate value data, etc.) and the conversion command cancellation block "G99;," are additionally programmed in the main program. Each of the sub-programs contains a data block "0002;," "0003;," or "0004;" specifying the sub-program number, a required number of movement command blocks "~;," and a data block including a code "M99" indicating the end of the sub-program.

Figure 14:
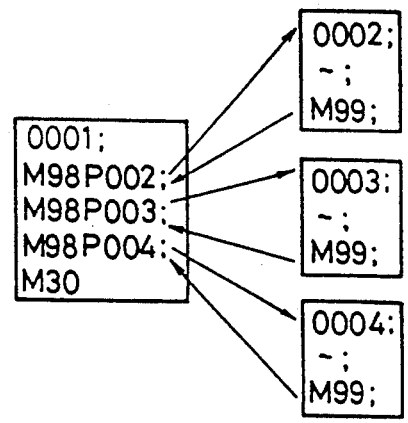
FIG. 14 is a diagram showing post-editing NC data corresponding to the original data of FIG. 13.
Figure 15:
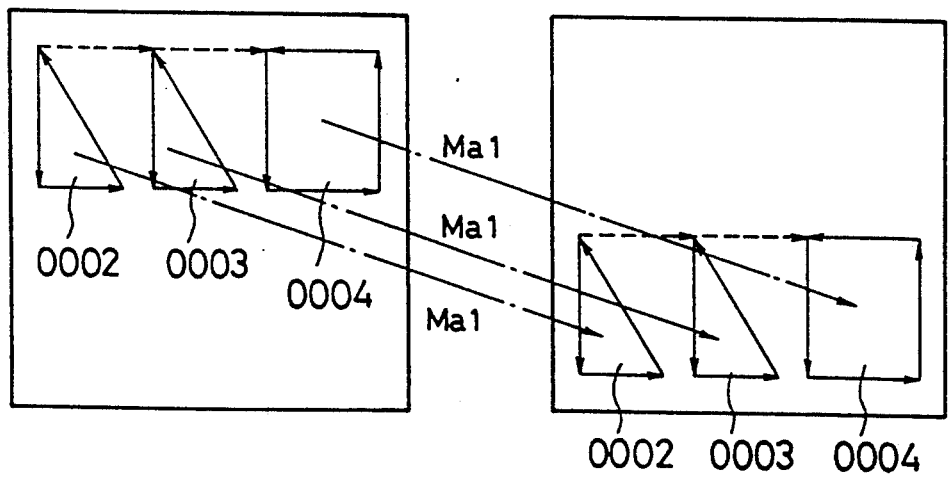
FIG. 15 is a diagram showing tool paths generated in accordance with the NC data of FIGS. 13 and 14.

In the data conversion process for the NC data of FIG. 13, all the movement command blocks contained in the individual sub-programs are successively subjected to the positional conversion process using a position transformation matrix Ma1 calculated in the same manner as in the case of the foregoing embodiment, on the basis of the contents of the three positional conversion command blocks. FIG. 14 shows post-editing NC data corresponding to the original data of FIG. 13. The left-hand half of FIG. 15 illustrates tool paths generated in accordance with the contents of the movement command blocks of the sub-programs of the original NC data, and the right-hand half of FIG. 15 illustrates similar tool paths corresponding to the post-editing NC data. After all, the tool paths defined by the sub-programs of the original NC data, e.g., parts configurations, are individually translated to required regions by the aforesaid positional conversion process without changing the positional relationship between them. Thus, if the present invention is applied to the NC data of FIG. 13, all the sub-programs assigned by means of the main program can be equally subjected to the positional conversion process by simply defining the positional conversion block in the main program.

Only the mirror conversion or both the positional conversion and the mirror conversion can be defined in the main program by further modifying the example of FIG. 13 in which only the positional conversion is defined in the main program. Since the operation of the automatic programming apparatus for this case is evident from the description in connection with the above embodiment and FIG. 13, a description thereof is omitted.

Figure 16:
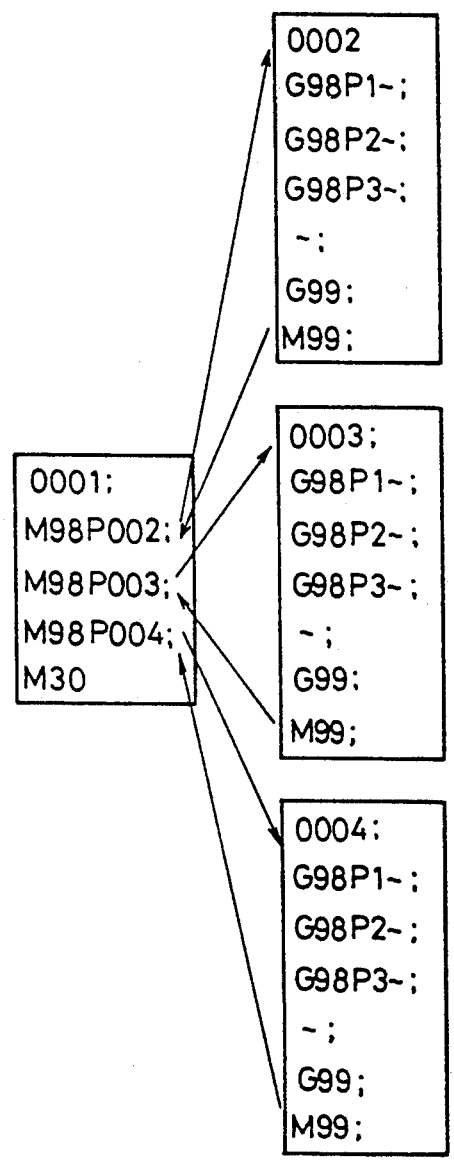
FIG. 16 is a diagram showing a further modification of the original data.

FIG. 16 shows another example of NC data composed of a main program and a group of sub-programs. In FIG. 16, the main program is created in the same manner as the main program of FIG. 13, except that it contains neither a positional conversion command block nor a conversion command cancellation block. Each of the sub-programs, like each sub-program of FIG. 13, contains a data block specifying the sub-program number, movement command blocks, and a data block indicating the end of the sub-program. The positional conversion command blocks "G98P1~;," "G98P2~;," and "G98P3~;" (where symbol "~" represents coordinate value data, etc.) and the conversion command cancellation block "G99;" peculiar to the present invention are additionally programmed in each sub-program.

Figure 17:
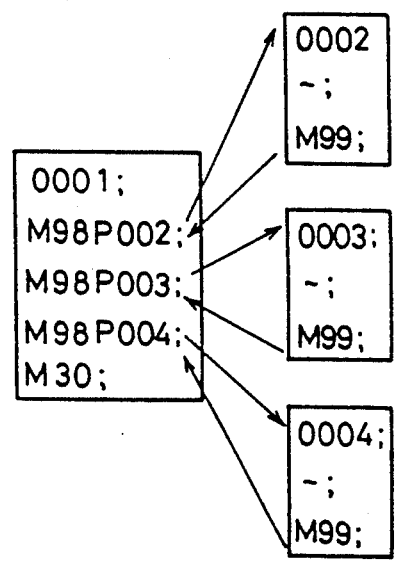
FIG. 17 is a diagram showing post-editing NC data corresponding to the original data of FIG. 16.
Figure 18:
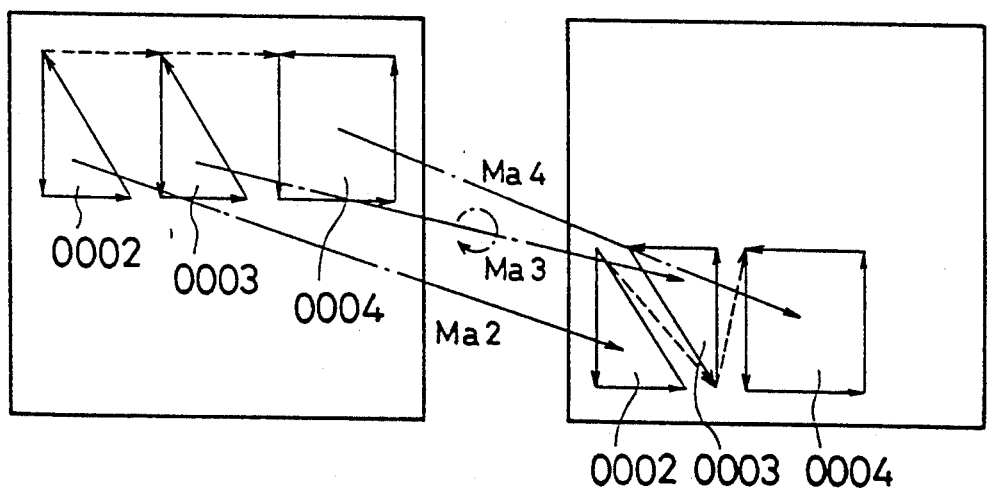
FIG. 18 is a diagram showing tool paths generated in accordance with the NC data of FIGS. 16 and 17.

When a sub-program specified by sub-program number "0002" is invoked in a data conversion process for the NC data of FIG. 16, a position transformation matrix Ma2 is calculated on the basis of the contents of the three positional conversion command blocks contained in the sub-program, and all the movement command blocks contained in this sub-program are then successively subjected to the positional conversion process using the matrix Ma2. When the next sub-program is invoked, a position transformation matrix Ma3 is calculated in a like manner, and all the movement command blocks in this sub-program are subjected to the positional conversion process using the position transformation matrix Ma3. When the last sub-program is invoked, the same positional conversion process is executed using a position transformation matrix Ma4 calculated in a like manner. FIG. 17 shows post-editing NC data corresponding to the original data of FIG. 16. The left-hand half of FIG. 18 illustrates tool paths generated in accordance with the contents of the movement command blocks of the sub-programs of the original NC data, and the right-hand half of FIG. 18 illustrates similar tool paths corresponding to the post-editing NC data. As seen from FIG. 18, the positional conversion command block of each sub-program of FIG. 16 contains coordinate value data used to define the matrix Ma2 or Ma4 for the translation of the tool paths or coordinate value data used to define the matrix Ma3 for the translation and rotational transfer of the tool paths.

In FIG. 18, the tool paths defined by the individual sub-programs of the original NC data, e.g., parts configurations, are independently moved to required rotational positions and required regions by the aforesaid positional conversion process. Thus, if the present invention is applied to the NC data of FIG. 16, new NC data capable of ensuring parts arrangement with high material utilization efficiency can be generated, utilizing the coordinate value data defined in the movement command blocks of the individual sub-programs of the original NC data, by defining the positional conversion block in each sub-program. Only the mirror conversion or both the positional conversion and the mirror conversion can be defined in any sub-program by further modifying the example of FIG. 16.

Although three-dimensional NC data has been described in connection with the embodiment and various modifications described above, the present invention may be also applied to two-dimensional NC data. In this case, it is only necessary that two positional conversion command blocks each containing coordinate value data indicating a reference point and a corresponding point be programmed in the NC data. Thus, in the case of the two-dimensional NC data, in contrast with the foregoing embodiment in which the position transformation matrix is calculated on the basis of three sets of reference points and corresponding points, the position transformation matrix can be calculated on the basis of two sets of reference points and corresponding points. In contrast with the aforementioned embodiment in which the coordinate value data indicating each of the two points in the mirror conversion command block is composed of three-dimensional data, each coordinate value data should only be composed of two-dimensional data.

In the embodiment and various modifications described above, each positional conversion command block contains the positional conversion command code "G98" having the qualifier codes "P1" to "P3" affixed thereto. Alternatively, only required positional conversion command blocks in the NC data may be made to contain the code "G98," and the code "G98," like the code "G01," may be prescribed so as to function modally.

What is claimed is:

1. An editing method for n-dimensional numerical control commands, comprising the steps of:
   (a) adding to the n-dimensional numerical control commands a positional conversion command composed of a positional conversion command code, reference coordinate value data indicating a group of n reference points which are permitted to be arbitrarily set, and corresponding coordinate value data indicating a group of n corresponding points in one-to-one correspondence with the group of n reference points;
   (b) adding a conversion cancellation command to the n-dimensional numerical control commands;
   (c) automatically calculating and storing a transformation matrix when the conversion command is read from the n-dimensional numerical control commands;
   (d) converting an input point associated with a movement command using the transformation matrix, thereby automatically obtaining a post-conversion point, for every movement command read from the numerical control commands, until the conversion cancellation command is read, after the transformation matrix is stored in step (c); and
   (e) automatically rewriting the n-dimensional numerical control commands to produce rewritten numerical control commands using the post-conversion point.

2. An editing method for numerical control commands according to claim 1, wherein said rewriting in step (e) writes the post-conversion point as a post-positional-conversion point, corresponding to the input point associated with the movement command, automatically obtained using the transformation matrix automatically calculated in step (c) in accordance with the reference and corresponding coordinate value data indicating the group of n reference points and the group of n corresponding points, when the positional conversion command code is read from the third numerical control commands.

3. An editing method for numerical control commands, comprising the steps of:
   (a) adding to the numerical control commands a conversion command including a mirror conversion command composed of a mirror conversion command code and coordinate value data indicating two points for assigning a straight line extending perpendicularly to a mirror plane and having a middle point thereof at which the mirror plane is located, the dimension of the coordinate value data being identical with the dimension of the numerical control commands;

(b) adding a conversion cancellation command to the numerical control commands;

(c) automatically calculating and storing a transformation matrix when the conversion command is read from the numerical control commands;

(d) converting an input point associated with a movement command using the transformation matrix, thereby automatically obtaining a post-conversion point, for every movement command read from the numerical control commands, until the conversion cancellation command is read, after the transformation matrix is stored in step (c); and (e) automatically rewriting the numerical control commands to produce rewritten numerical control commands using the post-conversion point.

4. An editing method for numerical control commands according to claim 3, wherein said rewriting in step (e) writes the post-conversion point as a post-mirror-conversion point, corresponding to the input point associated with the movement command, automatically obtained using the transformation matrix automatically calculated in step (c) in accordance with the coordinate value data indicating the two points, when the mirror conversion command code is read from the numerical control commands.

5. An editing method for first through fourth n-dimensional numerical commands, comprising the steps of:

(a) adding to first through fourth n-dimensional numerical control commands a positional conversion command composed of a positional conversion command code, reference coordinate value data indicating a group of n reference points which are permitted to be arbitrarily set, and corresponding coordinate value data indicating a group of corresponding points in one-to-one correspondence with the group of n reference points;

(b) adding a conversion cancellation command to the first through fourth n-dimensional numerical control commands to cancel the positional conversion command;

(c) automatically calculating and storing a transformation matrix when the conversion command is read from the first through fourth n-dimensional numerical control commands;

(d) converting an input point associated with a movement command using the transformation matrix, thereby automatically obtaining a post-conversion point, for every movement command read from the first through fourth n-dimensional numerical control commands, until the conversion cancellation command is read, after the transformation matrix is stored in step (c);

(e) automatically rewriting the first through fourth n-dimensional numerical control commands to produce rewritten numerical control commands using the post-conversion point;

(f) adding, before said adding in step (b), a mirror conversion command composed of a mirror conversion command code and n-dimensional coordinate value data indicating two points for assigning a straight line extending perpendicularly to a mirror plane and having a middle point thereof at which the mirror plane is located; and (g) adding, after said adding in steps (a) and (f) and before said adding in step (b), a conversion cancellation command cancelling the mirror conversion command added in step (f).

6. An editing method for numerical control commands according to claim 5, wherein said rewriting in step (e) writes the post-conversion point as a post-positional-conversion and post-mirror-conversion point corresponding to the input point associated with the movement command, automatically obtained using a position transformation matrix and a mirror transformation matrix, each automatically calculated in step (c) in accordance with the reference and corresponding coordinate value data indicating the groups of n reference points and n corresponding points and the n-dimensional coordinate value data indicating the two points used to define the mirror transformation matrix, after the positional conversion command code and the mirror conversion command code have been read from the numerical control commands.

7. An editing method for numerical control commands, comprising the steps of:

(a) adding a conversion command to the numerical control commands;

(b) adding a conversion cancellation command to the numerical control commands;

(c) automatically calculating and storing a transformation matrix when the conversion command is read from the numerical control commands;

(d) converting an input point associated with a movement command using the transformation matrix, thereby automatically obtaining a post-conversion point, for every movement command read from the numerical control commands, until the conversion cancellation command is read, after the transformation matrix is stored in step (c);

(e) automatically rewriting the numerical control commands to produce rewritten numerical control commands using the post-conversion point;

(f) repeating steps (a) and (b) to add a plurality of conversion and conversion cancellation commands to the numerical control commands;

(g) repeating step (c) to calculate the transformation matrix upon reading each conversion command; and (h) calculating an up-to-date composite transformation matrix automatically by multiplying a previously obtained up-to-date composite transformation matrix by the transformation matrix obtained in step (c) for a most recently read conversion command for use in conversion of the point associated with all movement commands until another one of the conversion and conversion cancellation commands is read.

8. An editing method for numerical control commands according to claim 7, further comprising the step of (i) multiplying the up-to-date composite transformation matrix by an inverse of the transformation matrix obtained for a most recently read uncancelled conversion command to produce a new up-to-date composite transformation matrix, every time one of the conversion cancellation commands is read.

9. An editing method for numerical control commands composed of a main program and a group of sub-programs, comprising the steps of:

(a) adding a conversion command to the numerical control commands to;

(b) adding a conversion cancellation command to the numerical control commands;

(c) automatically calculating and storing a transformation matrix when the conversion command is read from the numerical control commands;
(d) converting each conversion command in the main program to an input point associated with a movement command in the main program and movement commands in the group of sub-programs using the transformation matrix, thereby automatically obtaining a post-conversion point, for every movement command read from the numerical control commands, until the conversion cancellation command corresponding thereto is read; and
(e) automatically rewriting the numerical control commands to produce rewritten numerical control commands using the post-conversion point.

10. An editing method for numerical control commands composed of a main program and a group of sub-programs, comprising the steps of:

(a) adding a conversion command to the numerical control commands to;
(b) adding a conversion cancellation command to the numerical control commands;
(c) automatically calculating and storing a transformation matrix when the conversion command is read from the numerical control commands;
(d) converting each conversion command in each sub-program to movement commands in that sub-program using the transformation matrix, thereby automatically obtaining a post-conversion point, for every movement command read from the numerical control commands, until the conversion cancellation command corresponding thereto is read; and
(e) automatically rewriting the numerical control commands to produce rewritten numerical control commands using the post-conversion point.

* * * * *

UNITED STATES PATENT AND TRADEMARK OFFICE
CERTIFICATE OF CORRECTION

PATENT NO. : 5,297,023
DATED : March 22, 1994
INVENTOR(S) : Masaki Seki et al.

It is certified that error appears in the above-indentified patent and that said Letters Patent is hereby corrected as shown below:

Title Page, [57] Abstract, line 12, delete "(215)" and substitute --(S215)--;

line 14, delete "now" and substitute --new--.

Column 6, line 31, delete "i" and substitute --$\underline{i}$--.

Column 7, lines 42 and 50, delete "i" and substitute --$\underline{i}$--.

Column 8, lines 9 and 19, delete "i" and substitute --$\underline{i}$--; and line 57, after "thus" insert --,--.

Column 9, lines 11, 25 and 41, delete "i" and substitute --$\underline{i}$--.

Signed and Sealed this

Fourth Day of October, 1994

Attest:

BRUCE LEHMAN

Attesting Officer

Commissioner of Patents and Trademarks